US008206302B2

(12) United States Patent
Zhang et al.

(10) Patent No.: US 8,206,302 B2
(45) Date of Patent: Jun. 26, 2012

(54) METHOD AND APPARATUS FOR FILLING DOPPLER SIGNAL GAPS IN ULTRASOUND DIAGNOSTIC IMAGING

(75) Inventors: Yu Zhang, Shenzhen (CN); Xin Li, Shenzhen (CN)

(73) Assignee: Shenzhen Mindray Bio-Medical Electronics Co., Ltd., Shenzhen (CN)

( * ) Notice: Subject to any disclaimer, the term of this patent is extended or adjusted under 35 U.S.C. 154(b) by 1099 days.

(21) Appl. No.: 11/870,296

(22) Filed: Oct. 10, 2007

(65) Prior Publication Data
US 2009/0012398 A1 Jan. 8, 2009

(30) Foreign Application Priority Data

Jul. 3, 2007 (CN) .......................... 2007 1 0128712

(51) Int. Cl.
*A61B 8/00* (2006.01)
(52) U.S. Cl. ........ 600/453; 600/437; 600/443; 600/456; 600/441; 600/448; 382/128; 382/262; 382/270; 382/272
(58) Field of Classification Search .................. 600/443, 600/437, 453–457, 440–441, 448; 382/128, 382/260–262, 270, 272–274
See application file for complete search history.

(56) References Cited

U.S. PATENT DOCUMENTS

| 5,634,468 A | | 6/1997 | Platt et al. | |
|---|---|---|---|---|
| 5,642,732 A | * | 7/1997 | Wang | 600/453 |
| 5,860,928 A | * | 1/1999 | Wong et al. | 600/453 |
| 5,876,341 A | * | 3/1999 | Wang et al. | 600/441 |
| 6,110,113 A | * | 8/2000 | Banjamin et al. | 600/441 |
| 6,364,838 B1 | | 4/2002 | Freiburger et al. | |
| 6,450,959 B1 | * | 9/2002 | Mo et al. | 600/441 |
| 2005/0215897 A1 | | 9/2005 | Sakaguchi et al. | |
| 2007/0147235 A1 | | 6/2007 | Kim | |

FOREIGN PATENT DOCUMENTS

JP 09-028709 2/1997
(Continued)

OTHER PUBLICATIONS

Jeung-Kye Kim, English translation of China patent publication No. CN1897685, *Digital broadcast receiver and its oriented channel variation method*, published Jan. 17, 2007.
Fumikoo Sakaguchi et al., English translation of China patent publication No. CN1644170, *Ultrasonic diagnosing device, ultrasonic image data processing method and device*, published Jul. 27, 2005.
China patent application No. 200710128712.1, Search Report dated Jul. 16, 2007.

*Primary Examiner* — Brian Casler
*Assistant Examiner* — Joel Lamprecht
(74) *Attorney, Agent, or Firm* — Kory D. Christensen; Stoel Rives LLP

(57) ABSTRACT

The present invention provides a method and apparatus for filling Doppler signal gaps. The method comprises steps of: storing Doppler signals before and after a gap; analyzing spectral characteristics of the Doppler signals to be filled; judging whether the Doppler signals are to be frequency compensated according to the spectral parameters; compensating the Doppler signals; and filling the gap by means of weighting and superposing the frequency compensated Doppler signals to be filled and the original Doppler signals before and after the gap based on the judging result. According to the method of the present invention, the Doppler signals before and after the gap are first subjected to frequency compensation, and then weighted and superposed with the acquired Doppler signals, thus obtaining a continuous spectrogram and audio output and maintaining the original spectral characteristics of the Doppler signal.

21 Claims, 6 Drawing Sheets

FOREIGN PATENT DOCUMENTS

| JP | 10-080424 | 3/1998 |
| JP | 10-165402 | 6/1998 |
| JP | 2000-107184 | 4/2000 |
| JP | 2005-028165 | 2/2005 |
| JP | 2006-075426 | 3/2006 |

* cited by examiner

METHOD AND APPARATUS FOR FILLING DOPPLER SIGNAL GAPS IN ULTRASOUND DIAGNOSTIC IMAGING

STATEMENT OF RELATED APPLICATION

The present application claims priority of the Chinese Patent Application No. 200710128712, entitled "method and apparatus for filling Doppler signal gaps in ultrasound diagnostic imaging", filed on Jul. 3, 2007, which is incorporated herein by reference in its entirety.

FIELD OF THE INVENTION

The present invention relates to a method and apparatus for ultrasound diagnostic imaging, and specifically to a method and apparatus for filling Doppler signal gaps.

BACKGROUND OF THE INVENTION

An ultrasound diagnostic imaging system, which can display two-dimensional image (such as B-mode imaging, color flow imaging etc.) and Doppler spectrogram in real time, has an important sense for clinical diagnosis. Whereby, a clinical doctor can obtain the status of blood flow in a certain Doppler sampling volume while observing anatomical structures in real time. There are two ways to obtain the status of blood flow, i.e. a real-time spectrogram displayed on a monitor and a real-time Doppler audio signal played from a speaker. In order to realize the above-mentioned real-time displays under two (even three) different imaging modes, the ultrasound imaging system assigns different time segments to different imaging modes using time division multiplexing technique and the system switches quickly among different modes periodically. Taking the B+D mode (i.e. B mode plus pulsed wave spectral Doppler mode) as an example, which is used commonly in clinic, the system alternates scan between two modes by controlling a time sequence of transmitted pulses. The simplest way is to transmit a single B pulse and a single Doppler pulse alternately. The main shortcoming of this way is reduction of the Doppler pulse repetition frequency (PRF), which causes significant decrease in a detectable maximum flow velocity. Another similar way is to transmit a single B pulse and a plurality of Doppler pulses alternately. Although this way has improved the maximum flow velocity detected by Doppler, the time for imaging a single frame of B-type image is prolonged, thus unfavorably influencing the real-time display of 2D image. Considering the imaging quality of 2D image, the present invention concerns a different kind of scanning, in which the imaging system initiates transmission of Doppler pulse after scanning over a frame of 2D image and the number of the transmitted Doppler pulses is large enough to obtain at least one Doppler power spectrum. Since a Doppler signal in 2-40 ms is usually regarded as a quasi-stationary signal, the gap length is required to be less than 40 ms as much as possible. Because the Doppler signal can not be acquired during time periods for B-mode imaging, it causes discontinuity of the Doppler signal. The discontinuous phenomenon (namely "Gap") exhibits a broken spectrogram, as shown in FIG. 1, which may lead to a failure of automatic Doppler spectral parameters estimation, and even introduce periodical abrupt mute in audio output, thus degrading the audio output to loss the reference significance for clinical diagnosis. Therefore, the technique for filling Doppler signal gaps has become an important one necessary for an ultrasound diagnostic imaging equipment.

The technique for filling Doppler signal gaps is used to improve the quality of spectral Doppler signal in an ultrasound diagnostic imaging equipment, especially useful when the ultrasound diagnostic imaging equipment is working in both 2D imaging mode (such as B-mode, color flow imaging mode etc.) and spectral Doppler mode. The ultrasound diagnostic imaging system realizes simultaneous imaging under different modes using time division multiplexing technique, and the system assigns different time segments to different imaging modes. When the system is working in both the 2D imaging mode and the spectral Doppler mode, there will be an evidently discontinuous phenomenon (namely "Gap") occurring in audio Doppler signal and spectrogram, which will bring great inconvenience for clinical diagnosis. In addition, the imaging frame rate of 2D image is decreased, although there is a relatively small influence on diagnostic performance. The Doppler signal gap filling technique fills the gaps by means of signal processing, so that the filled signal maintains a better continuity both in audio and in spectrogram, thus reducing the influence of the discontinuity of the acquired Doppler signal on clinical diagnosis. However, how to fill Doppler signal gaps effectively has always been a challenge in applications of spectral Doppler technique. With development in digital computer technique, researchers have proposed a lot of methods to solve this problem. According to output way of the spectrogram, the current methods for filling gaps are generally divided into two main classes: one is to fill 2D spectrogram directly by interpolation, and another is to calculate the spectrogram of the gap-filled signal.

A filling method is disclosed in U.S. Pat. No. 5,016,641 issued on May, 1991 to G. Schwartz, entitled "Spectral Interpolation of Ultrasound Doppler Signal", according to which the power spectrum before a gap is used to fill the power spectrum during the gap, thus producing a phase with certain randomness; a time-domain signal can be obtained by inverse fast Fourier transform (IFFT) according to the filled power spectrum with random phases; and a filled signal with no step can be obtained after the time-domain signal is weighted by means of a smooth window function and partially superposed. This method needs to execute IFFT each time the spectral line is updated, increasing the computation complexity.

A method for filling gaps in spectrogram and audio separately is disclosed in U.S. Pat. No. 5,476,097 issued on December, 1995 to M. T. Robinson, entitled "Simultaneous Ultrasonic Imaging and Doppler Display System", in which signals before and after a gap are filled in the gap in an inverse sequencing to guarantee the continuity at ends of the gap, but there is a jump in the joint. The noise caused by the discontinuity can be eliminated by digital-to-analog conversion followed by low pass filtering. However, because the spectrum of the signal is inverted after inverse sequencing of the quadrature Doppler signal, there is an inverse error in audio output after flow direction separation. According to this U.S. patent application Ser. No. 5,476,097, the spectrogram is filled from the middle of the gap to both sides respectively by means of the spectra at both ends of the spectrogram gap, and each spectrum is filled more than once (for example twice) until the filled spectrum is equal to the original spectrum in the filled time. The discontinuous spectra among them can be smoothed by interpolation or averaging.

A method for utilizing an artificial neural network to estimate spectra during a gap is disclosed in the paper of H. Klebak, J. A. Jensen and L. K. Hansen, "Neural Network for Sonogram Gap Filling", published in Proceedings of IEEE International Ultrasonics Symposium, vol. 2: 1553-1556.

However, the computation complexity of this method is too large to meet the real-time demand for the ultrasound diagnostic imaging system.

When the gap is short enough, the signals near the gap have similar statistical characteristics according to the quasi-stationary characteristic of the Doppler signal so that the Doppler signal in the gap may be estimated according to the signals before and after the gap. A method for utilizing a signal before a gap to estimate a signal in the gap by linear prediction is disclosed in the paper of K. Kristoffersen and B. A. J. Angelsen, "A Time-shared Ultrasound Doppler Measurement and 2-D Imaging System", published in *IEEE Trans. Biomed. Eng., vol.* 35: 285-295. The linear prediction is a method that estimates the Doppler signal in the gap by means of the least mean square error.

A method for filling Doppler signal gaps based on model estimation is disclosed in U.S. Pat. No. 5,642,732 issued on January, 1997 to J. S. Wang, entitled "Apparatus and Method for Estimating Missing Doppler Signals and Spectra". In this method, first, a variance of exciting noise and AR model coefficients of the Doppler signal before the gap are estimated, and reflection coefficients of the model are estimated from these AR coefficients. Similarly, noise variance, reflection coefficients and AR coefficients of the Doppler signal after the gap are estimated. Then, the reflection coefficient during the gap is interpolated (Interpolating AR coefficient directly may cause instability of the system, because the necessary and sufficient condition of the system stability is that amplitude of the reflection coefficient is less than 1, while the Burg estimation method can guarantee that the amplitude of the reflection coefficient is less than 1). Finally, AR coefficients are calculated from the estimated reflection coefficients, according which an IIR filter is constructed. The IIR filter is excited by white noise, and the filtered data is windowed and then is superposed and jointed with the actually acquired signal. Then, the spectra of the gap-filled Doppler signal can be computed by using the fast Fourier transform. In addition, since the power spectrum of the signal can be estimated directly from AR coefficients through the fast Fourier transform, the estimated power spectrum can also be directly output by normalizing the variance of the interpolated noise. This method can obtain continuous voice and spectrogram outputs. However, when the bandwidth of the signal is relatively wide, it is necessary to approach the spectrum by means of AR model of a higher order. Especially when there are both forward and reverse flow signals in the detected signals of blood flow, it may introduce much estimated error of AR model parameter, thus degrading the quality of the filled spectrogram and audio unfavorably. Additionally, the estimation by AR model of a high order has greater computation complexity, increasing the cost to implementation.

Two methods for producing a gap-filled signal are disclosed in U.S. Pat. No. 4,559,952 issued on December, 1985 to B. A. J. Angelsen and K. Kristoffersen, entitled "Method of Ultrasonically Measuring Blood Flow Velocity": 1. A broadband noise is passed through a filter to produce a signal to be filled, in which the coefficient of the filter can be controlled to produce the required spectral characteristics; 2. A Doppler signal in the last stored portion is read directly. In order to guarantee the continuity, the produced signal and the acquired signal are weighted by a window function and there may be an overlap portion between them. The method is applicable to the quasi-stationary Doppler signal. Nevertheless, large arterial blood flow may cause the flow velocity to increase or decrease fast during cardiac systole. In this case, discontinuity of spectrogram is produced easily when the gap length is relatively long.

A detailed method for utilizing broadband noise through a filter to produce a filled signal is disclosed in U.S. Pat. No. 4,934,373 issued on July, 1990 to B. A. J. Angelsen and K. Kristoffersen, entitled "Method and Apparatus for Synthesizing a Continuous Estimate Signal Provided by Ultrasonic Doppler Measurement on a Fluid Flow". The main idea is that the acquired signal is directly windowed and then used as coefficients of a FIR filter, and the same power spectrum with random phases can be obtained after the broadband noise is passed through the filter. While implementing the method, considering that change in bandwidth of a signal is relatively slow, the signal is demodulated to the baseband frequency using an average frequency and the demodulated signal is windowed as the coefficient of the filter. After estimating the average frequency in the filled time, the filtered baseband signal will be modulated to a higher frequency by means of the estimated average frequency, obtaining the signal in the filled point. In order to guarantee the continuity of the estimated signal, the estimated signal is weighted by a window function and then superposed before output. According to this method, the original acquired Doppler signal and the Doppler signal in the gap are replaced with the result filtered by the filter directly, addressing the problem of the discontinuity of the audio and spectrogram. However, nonstationarity of the Doppler signal and window weighting of the filter coefficients may produce an over-estimated spectral bandwidth.

A method for utilizing Doppler data before and after a gap to fill the gap is disclosed in U.S. Patent Application 2007/0049823 filed on March, 2007 by Y. Li, entitled "Method for Processing Doppler Signal Gaps", in which the data before and after the gap are first passed through a high pass filter, and then read in a positive sequence and filled in the gap. Front section of the gap is filled with the data before the gap and its rear section is filled with the data after the gap. For the discontinuous section at the joint, window weighting is used to converge the data to zero to guarantee data continuity. However, this method can not address the problem of the discontinuity of spectrogram occurring when the flow velocity is fast increased or decreased. Moreover, as a result of converging the data to zero by window weighting of the signal at the joint, the signal energy will change periodically, and the spectrogram will exhibit a periodic bright-dark change, while audio will exhibit a periodic strong-weak change.

A method for utilizing Doppler data before a gap (or before and after a gap) to smoothly fill the data in the gap is disclosed in U.S. Pat. No. 5,891,036 issued on April, 1999 to M. Lzumi, entitled "Ultrasonic Wave Doppler Diagnosing Apparatus". In the first embodiment, the data before the gap is read in a reverse sequence and then is stored in the gap position after conjugation (or exchanging real part with imaginary part). Since the start point of the gap can produce a discontinuous phase after conjugation, a phase deviation at this point is then calculated to compensate for the data in the gap. This method can realize a totally smooth joint at the start point of the gap, whereas there may be discontinuity at the end point of the gap. In the second embodiment, the same process is carried out on the data after the gap in consideration of the data before the gap. Thereafter, the processed data before and after gap are weighted and then superposed to guarantee continuous, smooth transitions in both ends of the gap. This method can not either address the problem of the discontinuity of spectrogram occurring at the time of fast increasing or decreasing of the flow velocity.

The present invention provides a new method for filling Doppler signal gaps, which utilizes the Doppler signal before and/or after the gap to fill it. The method is different from the prior art in that frequency modulation is performed on the Doppler signals before and/or after the gap before that signal and the acquired Doppler signals are weighted by a window function and superposed, thus obtaining continuous spectrogram and audio outputs. This method maintains an excellent original spectral characteristics of Doppler signals.

SUMMARY OF THE INVENTION

In order to realize the object of the present invention, the following technical solutions are adopted.

According to the first aspect of embodiments of the present invention, there is provided a method for filling quadrature Doppler signal gaps in ultrasound diagnostic imaging, comprising the steps of: storing Doppler signals before and after a gap; reading the Doppler signals before and after the gap as the Doppler signals to be filled and analyzing spectral characteristics of the Doppler signals to be filled to obtain spectral parameters of the signals; judging whether the Doppler signal to be filled is to be frequency compensated according to the spectral parameters; compensating the Doppler signal to be filled according to the spectral parameters; and filling the gap by means of weighting and superposing the frequency compensated Doppler signals to be filled and the original Doppler signal before and after the gap if the Doppler signals to be filled meet a frequency compensation condition, or by means of weighting and superposing the Doppler signals to be filled and the original Doppler signals before and after the gap directly if the Doppler signals to be filled do not meet the frequency compensation condition.

Preferably, an autocorrelation method is used to estimate the spectral parameter of the Doppler signals to be filled in the analyzing step. Alternatively, in the analyzing step, the spectra of the Doppler signals to be filled are obtained by Fourier transform and then the spectral parameters of the signals are estimated from the spectra.

In the judgement step, the Doppler signals to be filled are determined to be frequency compensated when bandwidths of the Doppler signals before and after the gap are less than a predetermined threshold. Alternatively, in this step, the Doppler signals to be filled are determined to be frequency compensated when mean frequencies of the Doppler signals before and after the gap are greater than a predetermined threshold and meanwhile the difference between the mean frequencies of the Doppler signals before and after the gap are greater than another predetermined threshold. Still alternatively, in this step, the Doppler signals to be filled are determined to be frequency compensated when the power of the Doppler signal before and after the gap is greater than a predetermined threshold.

The compensating step further comprises steps of: estimating mean frequencies of the Doppler signals in the gap from the mean frequencies of the Doppler signals before and after the gap by means of interpolation; determining frequencies of complex sinusoidal signals for frequency compensation based on the differences between the estimated mean frequencies of the Doppler signals in the gap and the mean frequencies of the Doppler signal before and/or after the gap; and multiplying the Doppler signals to be filled by the complex sinusoidal signals to implement the frequency compensation, wherein estimating the mean frequencies of the Doppler signals in the gap by means of interpolation comprises compensation of spectral aliasing; the Doppler signals to be filled multiplied by the complex sinusoidal signals may be the Doppler signals before and after the gap, or either of them according to judgement on the respective spectral parameters.

The filling step further comprises steps of: weighting the frequency compensated Doppler signals to be filled by a window function decreasing gradually to 0 at both ends; and weighting the original Doppler signal before the gap by a window function decreasing gradually from 1 to 0; and weighting the original Doppler signal after the gap by a window function increasing gradually from 0 to 1; wherein the superposing result of the window functions is 1.

According to the second aspect of embodiments of the present invention, there is provided an apparatus for filling quadrature Doppler signal gaps in ultrasound diagnostic imaging, comprising: a storage module for storing the Doppler signals before and after a gap; an analysis module for reading the Doppler signals before and after the gap as the Doppler signals to be filled and analyzing spectral characteristics of the Doppler signals to be filled to obtain spectral parameters of the signals; a judgement module for judging whether the Doppler signals to be filled are to be frequency compensated according to the spectral parameters; a frequency compensation module for compensating the Doppler signals to be filled according to the spectral parameters; and a gap filling module for filling the gap by means of weighting and superposing the frequency compensated Doppler signals to be filled and the original Doppler signals before and after the gap if the Doppler signals to be filled meet a frequency compensation condition, or by means of weighting and superposing the Doppler signals to be filled and the original Doppler signal before and after the gap directly if the Doppler signals to be filled do not meet the frequency compensation condition.

Preferably, the analysis module uses an autocorrelation method to estimate the spectral parameters of the Doppler signals to be filled. Alternatively, the analysis module obtains spectra of the Doppler signals to be filled by Fourier transform and then estimates the spectral parameters of the signals from the spectra.

The Doppler signals to be filled are frequency compensated when the judgement module judges that bandwidths of the Doppler signals before and after the gap are less than a predetermined threshold. Alternatively, the Doppler signals to be filled are compensated when the judgement module judges that mean frequencies of the Doppler signals before and after the gap are greater than a predetermined threshold and the difference between the mean frequencies of the Doppler signals before and after the gap are greater than another predetermined threshold. Still alternatively, the Doppler signals to be filled are frequency compensated when the judgement module judges that the power of the Doppler signals before and after the gap is greater than a predetermined threshold.

The compensation module estimates mean frequencies of the Doppler signals in the gap from mean frequencies of the Doppler signal before and after the gap by means of interpolation, and then determines frequencies of complex sinusoidal signals for frequency modulation based on the difference between the estimated mean frequencies of the Doppler signal in the gap and the mean frequencies of the Doppler signals before and/or after the gap, and finally multiplies the Doppler signals to be filled by the complex sinusoidal signals to implement the frequency compensation, wherein estimating mean frequencies of Doppler signals in the gap by means of interpolation comprises compensation of spectral aliasing; the Doppler signals to be filled multiplied by the complex sinusoidal signals may be the Doppler signals before and after the gap, or either of them according to judgement on the respective spectral parameters.

The gap filling module weights the frequency compensated Doppler signals to be filled by a window function decreasing gradually to 0 at both ends and weights the original Doppler signal before the gap by a window function decreasing gradually from 1 to 0, and weights the original Doppler signal after the gap by a window function increasing gradually from 0 to 1.

According to the technical solutions of the present invention, the method and apparatus for filling quadrature Doppler signal gaps in ultrasound diagnostic imaging have solved the problem of discontinuous spectrogram caused by filling the gaps during the fast change in flow velocity in prior art. Even when the gap length is relatively large, the method and apparatus according to embodiments of the present invention guarantee better continuity of the spectrogram and audio.

DETAILED DESCRIPTION OF THE INVENTION

Method for Filling Doppler Signal Gaps

Figure 1:
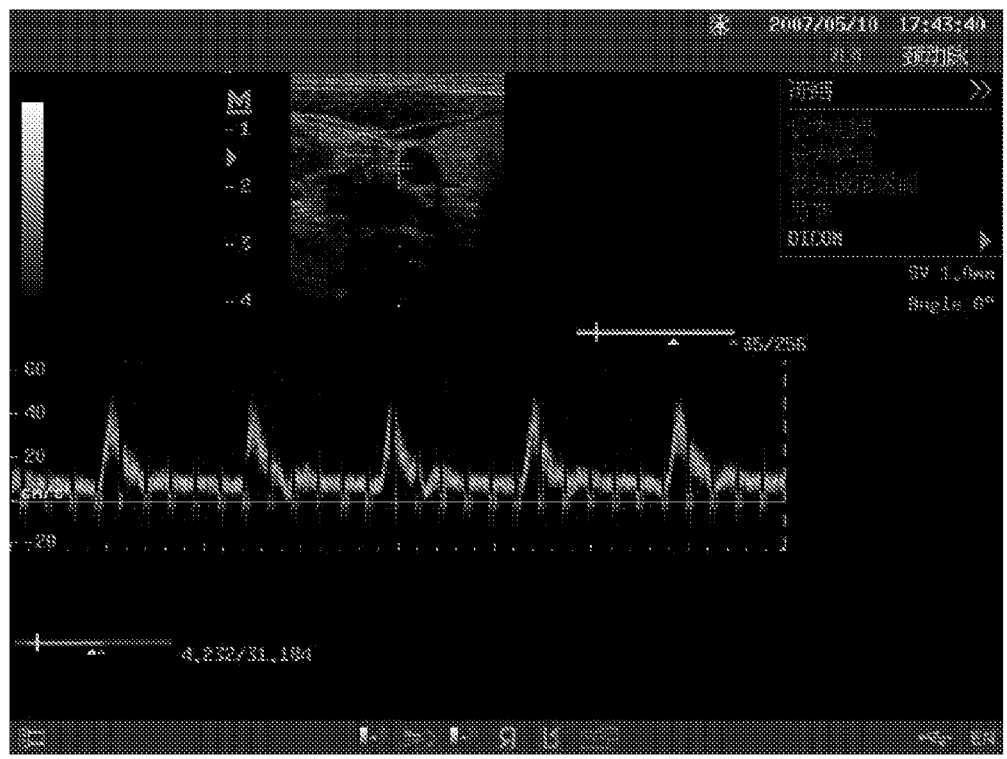
FIG. 1 is a spectrogram before gap filling.
Figure 2:
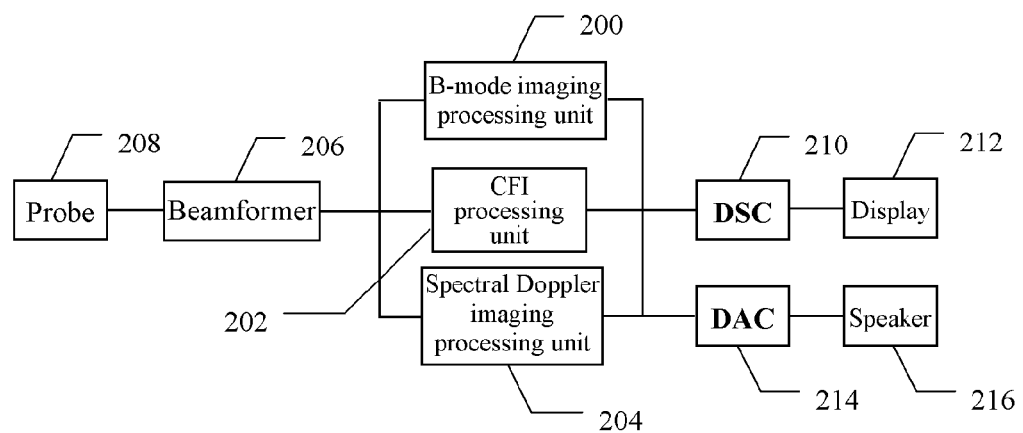
FIG. 2 is a block diagram of an ultrasound diagnostic imaging system.

FIG. 2 is a functional block diagram of a typical ultrasound diagnostic imaging system. The system has a B-mode imaging processing unit 200, a color flow imaging (CFI) processing unit 202 and a spectral Doppler imaging processing unit 204. The transmitted signal according to each imaging mode is applied to a probe 208 via a transmitting beamformer 206, and then the ultrasound signal enters into human body tissue via the probe 208. The backscattered ultrasound signal is received by the probe and subjected to the receiving beamforming, which then enters into respective processing units. The resultant images of the processing units are output to a display 212 for display via a digital scan converter (DSC) 210. In this system, the B-mode imaging unit 200 obtains a gray-encoded image about 2D anatomical structure in body tissue. Both the CFI processing unit 202 and the spectral Doppler imaging processing unit 204 are used to process blood flow Doppler signals. The CFI processing unit 202 transmits a package of pulsed waves (generally 8-16) along each scanning beam repeatedly and calculates a mean frequency, bandwidth and power of the received Doppler signals in a plurality of range cells. The calculated results are superposed on the B-mode image for color display. Additionally, an audio signal processed by the processing unit is transformed into an analog signal via a digital-to-analog converter (DAC) 214 and output to a speaker 216. The spectral Doppler technique is used to obtain information about blood flow in a single sampling volume in a fixed scanning beam. This technique may be classified into a continuous wave (CW) Doppler technique and a pulsed wave (PW) Doppler technique according to different transmitting waveforms, in which the former transmits a continuous wave and the latter transmits a pulsed wave repeatedly.

Figure 3:
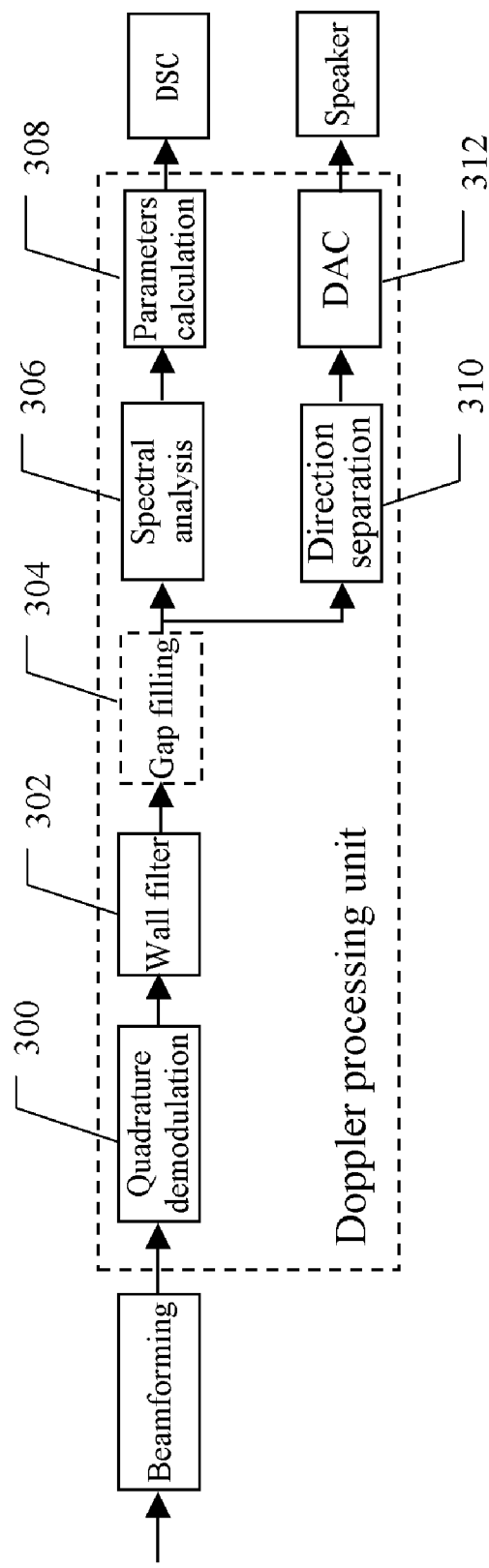
FIG. 3 is a block diagram of a Doppler processing unit.

FIG. 3 is a block diagram of a typical process of the spectral Doppler technique. The received radio-frequency echo signal is transformed into a baseband signal through quadrature demodulation (block 300). Since the bandwidth of the demodulated Doppler signal is generally thousands of Hz, the frequency range is of the audio range and the signal is also known as an audio Doppler signal. Because the Doppler signal produced by a stationary or a slowly moving tissue has a relative large amplitude and a relative low frequency, and presence of that tissue signal will have an unfavorable effect on the acquisition of information about weak blood flow, the Doppler processing unit makes use of a high pass filter (namely a wall filter) (block 302) to extract the blood flow signal. Blood flow velocity in blood vessel varies with cardiac systole and diastole, but blood flow velocity is considered as substantially constant in short time (for example 2-40 ms). According to Doppler effect, the frequency of the Doppler signal is proportional to blood flow velocity. The Doppler processing unit performs a spectral analysis (block 306) on the Doppler signal in short time to obtain power spectrum of the Doppler signal, which reflects the instantaneous distribution of blood flow velocity in blood vessel. The power spectra of the Doppler signal from different time consist of a 2D image, thus obtaining a spectrogram of the Doppler signal. Some important clinical diagnosis indices, such as maximum velocity, mean velocity and pulsating index etc., can be extracted from the spectrogram (block 308), which characterize blood flow status in blood vessel. The result of the spectral analysis is output to a display via the DSC. Additionally, forward and reverse blood flow signals can be obtained from the quadrature Doppler signal through a flow direction separation processing (block 310) and then transmitted to two speakers via a digital-to-analog conversion (block 312) for audio output. The audio output of the Doppler signal is an important supplement to the spectrogram output and an important reference for adjusting the spectrogram output.

When working in a spectral Doppler imaging mode (taking PW as an example herein) and a 2D image mode simultaneously (such as B-mode, CFI mode etc., taking B-mode as an example herein), the ultrasound imaging system switches between these two imaging modes alternatively. When the system switches to the B-mode, it can not acquire the Doppler signal, that is, a Doppler signal gap is produced. According to the gap filling method of the present invention, the spectra and audio in the gap are smoothly filled employing the data before and/or after the gap.

Figure 4:
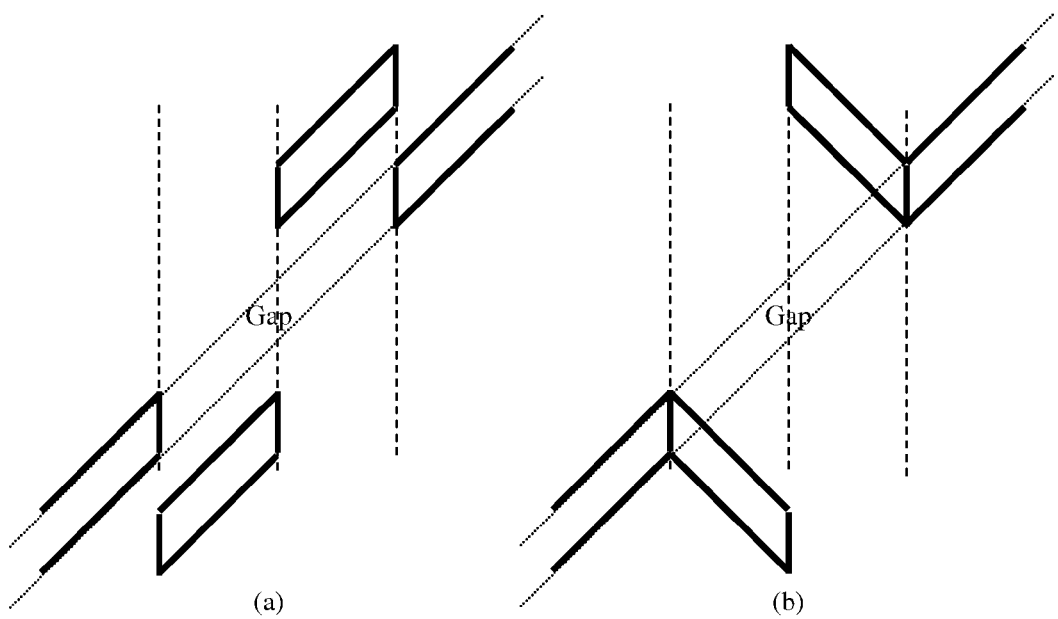
FIG. 4 is a schematic diagram of a spectrogram wherein the gap is filled according to a prior art method.

A discontinuous spectrogram usually occurs in processing a long gap by means of the existing gap filling methods. A spectrogram of a linear chirp signal, for example, may be used to simulate the fast increasing of flow velocity in the early stage of cardiac systole. FIG. 4 is a schematic diagram of the discontinuous spectrogram caused by the existing gap filling methods, in which FIG. 4(a) shows a method for utilizing the signals (or spectra) before and after the gap respectively to fill the signals (or spectra) in first half and latter half sections of the gap directly and FIG. 4(b) shows a method for utilizing the signals (or spectra) before and after the gap through an inverse sequence in time-domain (the complex signal also includes a conjugating process) to fill the signals (or spectra) in first half and latter half sections of the gap. It is evident that these two methods may cause discontinuity of the spectrogram in such a case.

Figure 5:
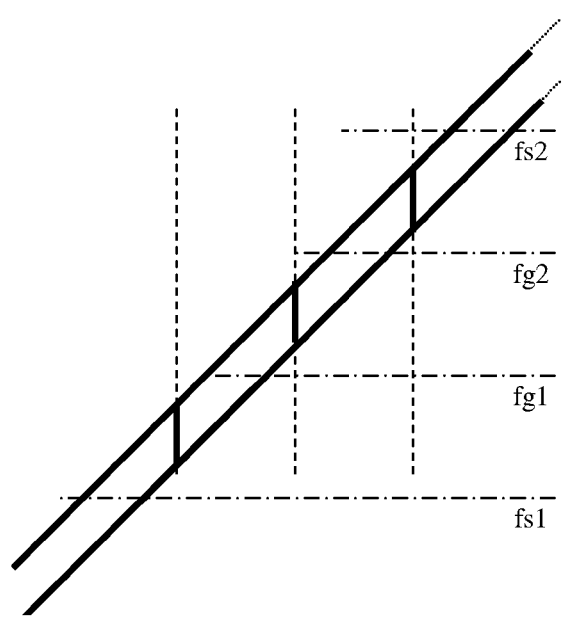
FIG. 5 is a schematic diagram of a spectrogram wherein the gap is filled according to a method of embodiments of the present invention.

The method according to the present invention is to frequency compensate the signal before and/or after the gap before filling the gap, the filling result of which is shown in FIG. 5.

Figure 6:
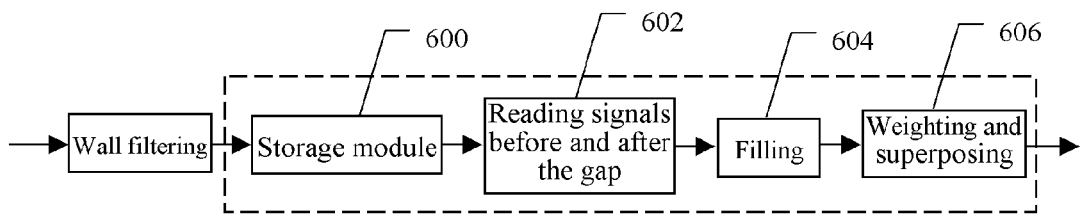
FIG. 6 is a block diagram for implementing gap filling.

FIG. 6 shows an embodiment of the gap filling method. The system determines the gap length based on transmission sequences of B-mode and PW mode, and the Doppler processing unit judges whether there is a signal gap from the length of the received Doppler signal. If the system does not detect a signal gap, the acquired Doppler signal which was quadrature-demodulated is saved in a storage module (block 600) and processing such as wall filtering, spectral analysis etc. is performed on the acquired signal. If the system detects a signal gap, the Doppler signals before and after the gap are read from the memory (block 602) and judged whether they are the wall filtered Doppler signals. If they are not, the wall filtering is required before filling to filter out the effect of the tissue and vessel wall echo of low frequency on estimating the parameters of blood flow signal. The wall filtering herein may be carried out using an infinite impulse response (IIR) digital filter. As to the Doppler signal after the gap, because of uncertainty of the initial state, the wall filtering may be accomplished by the IIR filter through a step initialization or a projection initialization. The wall filtering as a known technique in processing Doppler signal is not described in details herein. After the filtered signal is filled (block 604), it is necessary that the signal to be filled and the original Doppler signals before and after the gap are weighted and superposed (block 606) in order to guarantee the continuity of the signals before and after the gap. The weighted and superposed signal can be input directly into the subsequent Doppler signal processing step.

Figure 7:
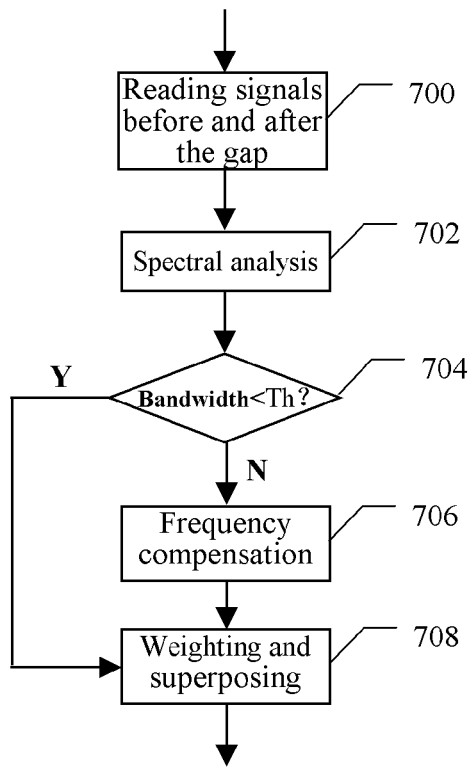
FIG. 7 is a flow chart for implementing gap filling according to a method of embodiments of the present invention.

FIG. 7 is a flow chart of the gap filling process. The system reads the Doppler signals before and after the gap (step 700) as Doppler signals to be filled and performs a spectral analysis on these signals (step 702). In this embodiment, the spectral analysis is finished using an autocorrelation method, i.e. a method which utilizes directly an autocorrelation estimator in time-domain to estimate the parameters of the Doppler signal such as a mean frequency, bandwidth and mean power etc. For an quadrature Doppler signal with a length M, $x_i = I_r + jQ_i$, where j is square root of (−1), we can obtain by means of the autocorrelation estimate:

$$N = \sum_{i=1}^{M-1} (I_i Q_{i+1} - I_{i+1} Q_i),$$

$$D = \sum_{i=1}^{M-1} (I_i I_{i+1} + Q_i Q_{i+1}),$$

$$R(0) = \sum_{i=1}^{M-1} \frac{I_i^2 + I_{i+1}^2 + Q_i^2 + Q_{i+1}^2}{2},$$

where R(0) is power of a signal; and based on the parameters N and D, we can further obtain:

$$\text{Phase} = \tan^{-1}\left(\frac{N}{D}\right),$$

$$Magn = \sqrt{N^2 + D^2},$$

where Phase is an mean angular frequency of a signal, which is divided by $2\pi$ to obtain a normalized digital frequency. From Magn and R(0), we can estimate a variance of the signal:

$$\text{var} = 1 - \frac{Magn}{R(0)}.$$

Bandwidth of the signal can be indicated as a square root of the above variance.

Evidently, the spectral analysis of the signals before and after the gap can also utilize Fourier transform to obtain spectrum of the signal and estimate it in frequency-domain, which is a known technique and is not described in detail herein.

Upon acquisition of the spectral parameters from the spectral analysis, these parameters can be used to judge (step 704) whether the Doppler signal to be filled needs a frequency compensation before filling the gap. In this embodiment, bandwidth is used for the judgement, that is to say, the Doppler signal to be filled is compensated for frequency only when bandwidths of the Doppler signals before and after the gap are less than a predetermined threshold Th. In the case where the signals before and after gap are a Doppler blood flow signal and noise respectively, the mean frequency of the noise has a large estimated error and the frequency compensation should be based on the mean frequencies of the signals before and after the gap. So, if the signal to be filled is frequency compensated randomly, it may cause a large distortion in spectrogram. However, since noise generally has a much wider bandwidth than that of blood flow signal, the risk of distortion in spectrogram can be avoided to a certain extent by judging whether the bandwidth is less than a predetermined threshold. Additionally, the mean frequency can also be used for judgement, that is to say, the Doppler signal to be filled is frequency compensated only when the mean frequencies of the Doppler signals both before and after the gap are greater than a predetermined threshold and moreover the difference between the mean frequencies of the Doppler signals before and after the gap is also greater than a predetermined threshold. In addition, power information can also be used to judge whether the Doppler signals before and after the gap are the effective signals, i.e. when the power is less than a predetermined threshold, the signal is considered as noise and is not frequency compensated; otherwise, the signal is considered as a Doppler signal and is frequency compensated. The above conditions for judgements on the spectral parameters can be used alone or in combination.

According to the frequency compensation processing (step 706), the frequency modulation is implemented by multiplying the Doppler signal to be filled by complex sine waves of different frequencies, in which the frequency of the complex sine wave is obtained by interpolating the mean frequencies of the Doppler signals before and after the gap. As shown in FIG. 5, fs1 and fs2 are the mean frequencies of the Doppler signals before and after the gap respectively. If the gap is divided into a front section and a rear section, the frequencies fg1 and fg2 at the centers of the front and rear sections can be obtained by interpolation. The interpolation can be a linear interpolation or a nonlinear interpolation. In this embodiment, the linear interpolation is adopted, i.e.

$$fg1 = \frac{2}{3}fs1 + \frac{1}{3}fs2,$$

$$fg2 = \frac{1}{3}fs1 + \frac{2}{3}fs2.$$

Figure 8:
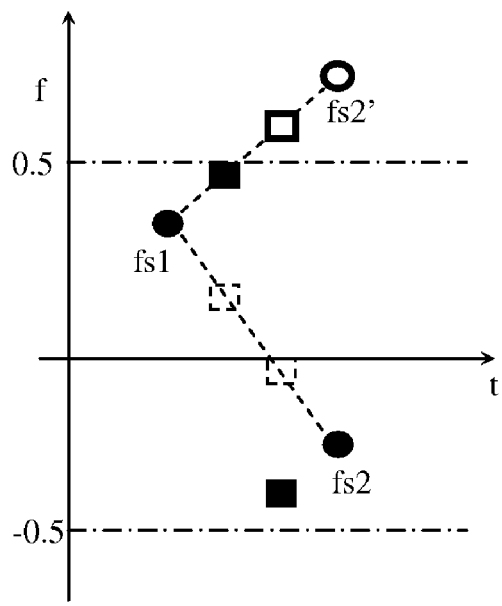
FIG. 8 is a schematic diagram for implementing aliasing compensation according to a method of embodiments of the present invention.

When spectral aliasing occurs in the Doppler signals before and after the gap, directly applying the linear interpolation will produce a frequency estimated as close to 0, thus resulting in a discontinuity of the filled spectrogram. So, aliasing compensation is required before frequency interpolation. A method for compensating the spectral aliasing is shown in FIG. 8, in which the two solid dots indicate fs1 and fs2 respectively. Spectral aliasing is judged to occur, when |fs1-fs2| is greater than a predetermined threshold. If fs1 and fs2 are interpolated directly, two incorrect mean frequencies will be estimated, shown as dotted squares in FIG. 8. In order to interpolate the frequency under aliasing, first, sign of fs2 should be judged and then the frequency fs2' under aliasing-free is estimated from the sign of fs2. If the sign of fs2 is negative, fs2 is replaced with fs2'=(fs2+1) to be interpolated; if the sign of fs2 is positive, fs2 is replaced with fs2'=(fs2−1) to be interpolated. The resultant fs2' is shown as hollow dots in FIG. 8. After that, the linear interpolation is performed on fs1 and fs2'. If the absolute value of the interpolated frequency is greater than 0.5, the corresponding frequency points in the frequency range of [−0.5, 0.5] can be obtained by means of the above similar methods. The interpolated frequency points are shown as solid squares in FIG. 8.

After the above-mentioned processes, the Doppler signal to be filled before the gap is frequency modulated by being multiplied by a complex sine wave having a frequency (fg1-fs1), and the Doppler signal having the frequency modulated is used to fill the first half of the gap. The Doppler signal to be filled after the gap is frequency modulated by being multiplies by a complex sine wave having a frequency (fg2-fs2), and the Doppler signal having the frequency modulated is used to fill the latter half of the gap. Additionally, the embodiment of present invention is not limited to utilizing both the Doppler signals before and after the gap to fill the gap. It is also feasible to utilize only one of the Doppler signals (for example the signal before the gap) to fill the gap based on the spectral characters of the Doppler signals before and after the gap. At this moment, the Doppler signal to be filled before the gap is frequency modulated by being multiplied by a complex sine wave having a frequency (fg1-fs1), and the signal having the frequency modulated is used to fill the first half of the gap, while the same signal is frequency modulated by being multiplied by a complex sine wave having a frequency (fg2-fs1), and the signal having the frequency modulated is used to fill the latter half of the gap.

Figure 9:
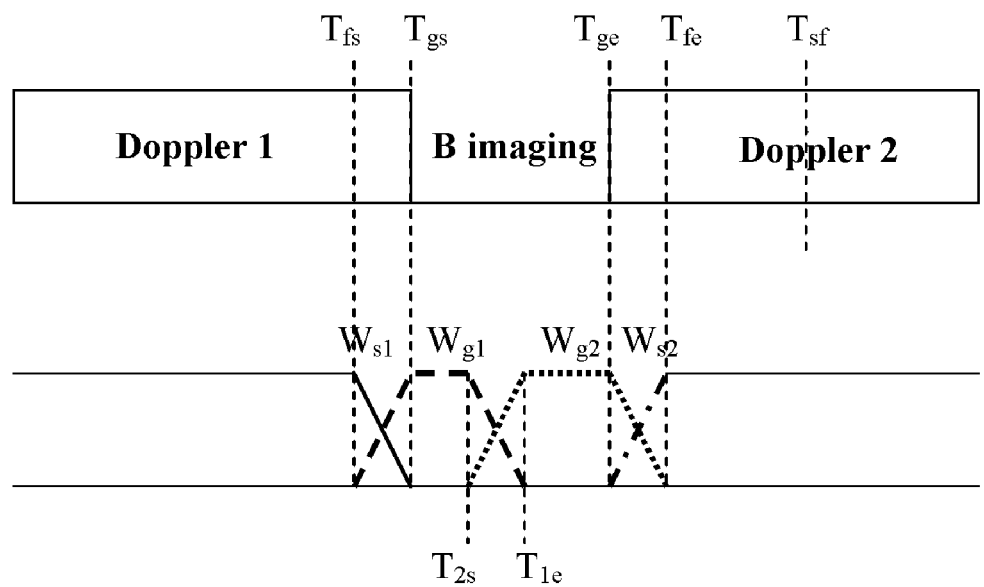
FIG. 9 is a schematic diagram for implementing weighting and superposition according to a method of embodiments of the present invention.

After the Doppler signals to be filled are obtained through the above-mentioned processes, the Doppler signals to be filled and the original Doppler signals before and after the gap (i.e. the Doppler signals which are not frequency modulated) are weighted and superposed (step 708). A schematic diagram of weighting and superposition is shown in FIG. 9, in which "Doppler 1" and "Doppler 2" on the upper portion of FIG. 9 indicate two adjacent Doppler scanning time periods respectively, and "B imaging" between them indicates a B imaging scanning time period between two Doppler scanning time periods, i.e. corresponding to the time period of the Doppler signal gap. The gap starts at time $T_{gs}$ and terminates at time $T_{ge}$ when the system re-acquires the quadrature Doppler signals. In order to guarantee the continuity of the filled signal, there should be some overlaps in the filled signal and the actually acquired Doppler signal. That is, the filled signal actually starts at time $T_{fs}$ and terminates at time $T_{fe}$. $[T_{fs},T_{gs}]$ and $[T_{ge},T_{fe}]$ in FIG. 9 are two overlapped sections of the signals respectively. For simplicity, the lengths of these two sections of the signals are equal. Since the data after the gap is required for filling, the actual filling calculation starts only when sufficient quadrature Doppler signals are acquired after the gap, as shown at $T_{sf}$ in FIG. 9. It can be seen that this method is not a real-time gap filling method, but a quasi real-time method. It can be considered that the signal output at $T_{sf}$ is the signal output at $T_{fs}$, i.e. there is a system delay of $(T_{fs}-T_{sf})$. Because the gap length is usually short, the system delay is also very short, which has no unfavorable effect on the Doppler spectrogram or the synchronization between the Doppler audio and the 2D B-mode image. Similarly, the signal in the gap is divided into two sections for filling, at the intersection of which there are some overlaps and the overlapped length can also be equal to the lengths of $[T_{fs}, T_{gs}]$ and $[T_{ge}, T_{fe}]$. A window function, which is used to weight the Doppler signal to be filled and the original Doppler signals before and after the gap, is shown on the bottom of FIG. 9. In general, the range of the weighting window function is [0,1]. It can be seen from FIG. 9 that the weighting function $W_{s1}$ for the original Doppler signal before the gap in time period $[T_{fs},T_{gs}]$ decreases gradually from 1 to 0 (shown as a bold line in FIG. 9), while the weighting function $W_{g1}$ for the signal to be filled in first half of the gap in time period $[T_{fs},T_{1e}]$ decreases gradually from 1 in the middle to 0 at both ends (shown as a bold dashed line in FIG. 9). Similarly, the weighting function $W_{g2}$ for the signal to be filled in latter half of the gap in time period $[T_{2s},T_{fe}]$ is similar as $W_{g1}$ (shown as a bold dash dotted line in FIG. 9). In order to guarantee that power of the signal in the gap is similar to powers of the signals before and after the gap, the sum of the weighting functions may be 1, i.e.

$$W_{s1}+W_{s2}+W_{g1}+W_{g2}=1$$

Figure 10:
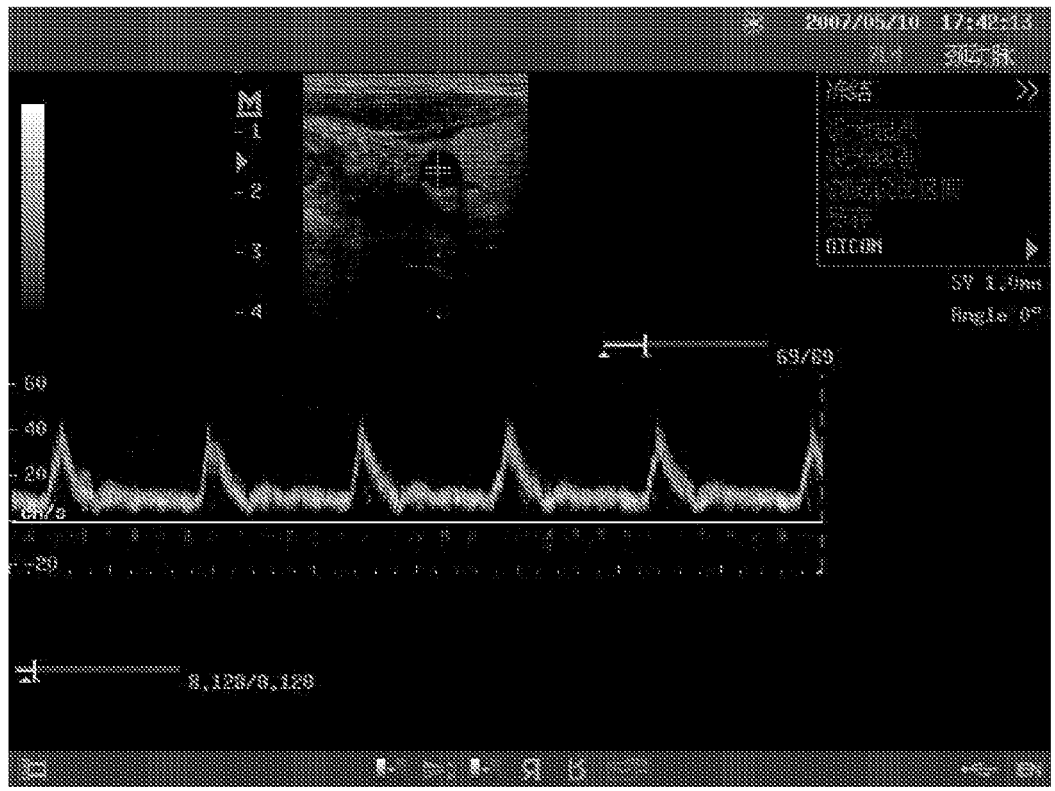
FIG. 10 is a spectrogram wherein the gaps are filled according to a method of embodiments of the present invention.

Filling the Doppler signal gaps is realized by weighting and then superposing the Doppler signals to be filled and the original Doppler signals before and after the gap. Whereby, continuity of waveform in time-domain and spectrogram in frequency-domain is guaranteed at both ends of the gap and ends of two sections of the filled signal. FIG. 10 shows a spectrogram with the gap filled according to the method of the embodiments of the present invention. The filled signal is input into the other modules such as spectral analysis module, flow direction separation module, etc. for corresponding Doppler signal processing.

The method for filling Doppler signal gaps described with reference to FIG. 7 further comprises storing the Doppler signals before and after the gaps.

For ones being familiar with Doppler signal processing, filling the gap with the frequency compensated Doppler signals before and after the gap directly is not limited to the embodiments presented herein. Modification in the sequence of certain processing of the technical solution still falls within the scope of the present invention. For example, the gap may be filled before wall filtering. The condition is that the Doppler signals to be filled are those wall-filtered Doppler signals before and after the gap, and that the signals to be filled having frequency compensated are superposed with an appropriate low frequency signal so that the signals to be filled have the same spectral character as that of the Doppler signals before and after the gaps. After that, the Doppler signals to be filled and the original Doppler signals before and after the gap are weighted and superposed, and the superposed signals are subjected to the other Doppler signal processing such as wall filtering, spectral analysis etc.

Apparatus for Filling Doppler Signal Gaps

Figure 11:
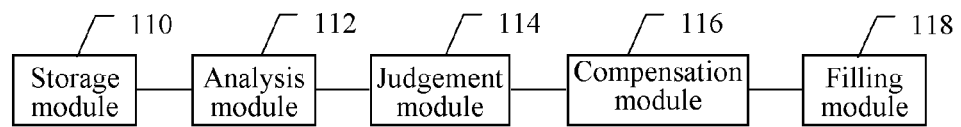
FIG. 11 is a block diagram of an apparatus for filling Doppler signal gaps according to embodiments of the present invention.

FIG. 11 is a block diagram of an apparatus for filling Doppler signal gaps according to the embodiments of the present invention, comprising a storage module 110, an analysis module 112, a judgement module 114, a compensation module 116 and a filling module 118, wherein the storage module 110 is used to store a Doppler signal before and after a gap; the analysis module 112 is used to read the Doppler signal before and after the gap as Doppler signals to be filled and analyze spectral characteristics of the Doppler signals to be filled to obtain spectral parameters of the signals; the judgement module 114 is used to judge whether the Doppler signals to be filled are to be frequency compensated from the spectral parameters; the compensation module 116 is used to frequency compensate the Doppler signals to be filled according to the spectral parameters; and the filling module 118 is used to fill the gap by means of weighting and superposing the frequency compensated Doppler signals to be filled and the original Doppler signals before and after the gap if a frequency compensation condition is met, or otherwise fill the gap by means of weighting and superposing the Doppler signals to be filled and the original Doppler signal before and after the gap directly, in accordance with the result output from the judgement module 114.

The invention claimed is:

1. A method for filling Doppler signal gaps produced by switching between two or more imaging modes in ultrasound diagnostic imaging, wherein a Doppler signal is not acquired during a gap, comprising the steps of:
storing a Doppler signals before and after the gap;
reading the Doppler signals before and after the gap as Doppler signals to be filled and analyzing spectral characteristics of the Doppler signals to be filled to obtain spectral parameters;
judging whether the Doppler signals to be filled are to be frequency compensated according to the spectral parameters;
frequency compensating the Doppler signals to be filled according to the spectral parameters, wherein the frequency compensated Doppler signals are frequency modulated to shift mean frequencies of the Doppler signals to be filled;
filling the gap by weighting and superposing the frequency compensated Doppler signals to be filled and the original Doppler signals before and after the gap if the Doppler signals to be filled meet a frequency compensation condition, or filling the gap by weighting and superposing the Doppler signals to be filled and the original Doppler signals before and after the gap directly if the Doppler signals to be filled do not meet the frequency compensation condition; and
displaying the resulting image of the resulting signals via a digital scan converter.

2. The method according to claim 1, wherein an autocorrelation method is used to estimate the spectral parameters of the Doppler signals to be filled in the analyzing step.

3. The method according to claim 1, wherein in the analyzing step, spectra of the Doppler signals to be filled are obtained by Fourier transform and then the spectral parameters of the signals are estimated from the spectra.

4. The method according to claim 1, wherein in the judging step, the Doppler signals to be filled are determined to be frequency compensated if bandwidths of the Doppler signals before and after the gap are less than a predetermined threshold.

5. The method according to claim 1, wherein in the judging step, the Doppler signals to be filled are determined to be frequency compensated if mean frequencies of the Doppler signals before and after the gap are greater than a predetermined threshold and meanwhile the difference between the mean frequencies of the Doppler signals before and after the gap is greater than another predetermined threshold.

6. The method according to claim 1, wherein in the judgement step, the Doppler signals to be filled are determined to be frequency compensated if power of the Doppler signals before and after the gap is greater than a predetermined threshold.

7. The method according to claim 1, wherein the frequency compensating step further comprises steps of:
estimating mean frequencies of the Doppler signals in the gap from mean frequencies of the Doppler signals before and after the gap by interpolation;
determining frequencies of complex sinusoidal signals for the frequency modulation according to the differences between the estimated mean frequencies of the Doppler signals in the gap and the mean frequencies of the Doppler signals before and/or after the gap; and
multiplying the Doppler signals to be filled by the complex sinusoidal signals to implement the frequency compensation.

8. The method according to claim 7, wherein estimating the mean frequencies of the Doppler signals in the gap by interpolation comprises compensation of spectral aliasing.

9. The method according to claim 7, wherein the Doppler signals to be filled multiplied by the complex sinusoidal signals may be both the Doppler signal before the gap and the Doppler signal after the gap, or alternatively either of them according to judgement on the respective spectral parameters.

10. The method according to claim 1, wherein the filling step further comprises the steps of:
weighting the frequency compensated Doppler signals to be filled by a window function decreasing gradually to 0 at both ends;
weighting the original Doppler signal before the gap by a window function decreasing gradually from 1 to 0; and
weighting the original Doppler signal after the gap by a window function increasing gradually from 0 to 1.

11. The method according to claim 10, wherein the superposing result of the window functions is 1.

12. An apparatus for filling Doppler signal gaps produced by switching between two or more imaging modes in ultrasound diagnostic imaging, wherein a Doppler signal is not acquired during a gap, the apparatus comprising the following modules:
a storage module for storing Doppler signals before and after the gap;
an analysis module for reading the Doppler signals before and after the gap as Doppler signals to be filled and analyzing spectral characteristics of the Doppler signals to be filled to obtain spectral parameters of the signals;
a judgement module for judging whether the Doppler signals to be filled are to be frequency compensated according to the spectral parameters;
a compensation module for frequency compensating the Doppler signals to be filled according to the spectral parameters, wherein the frequency compensated Doppler signals are frequency modulated to shift mean frequencies of the Doppler signals to be filled; and a filling module for filling the gap by weighting and superposing the frequency compensated Doppler signals to be filled and the original Doppler signals before and after the gap if the Doppler signals to be filled meet a frequency compensation condition, or filling the gap by weighting and superposing the Doppler signals to be filled and the original Doppler signals before and after the gap directly if the Doppler signals to be filled do not meet the frequency compensation condition.

13. The apparatus according to claim 12, wherein the analysis module uses an autocorrelation method to estimate the spectral parameters of the Doppler signals to be filled.

14. The apparatus according to claim 12, wherein the analysis module obtains spectra of the Doppler signals to be filled by Fourier transform and then estimates the spectral parameters of the signals from the spectra.

15. The apparatus according to claim 12, wherein the Doppler signals to be filled are frequency compensated if the judgement module judges that bandwidths of the Doppler signals before and after the gap are less than a predetermined threshold.

16. The apparatus according to claim 12, wherein the Doppler signals to be filled are frequency compensated when the judgement module judges that mean frequencies of the Doppler signals before and after the gap are greater than a predetermined threshold and meanwhile the difference between the mean frequencies of the Doppler signals before and after the gap is greater than another predetermined threshold.

17. The apparatus according to claim 12, wherein the Doppler signals to be filled are frequency compensated when the judgement module judges that power of the Doppler signals before and after the gap is greater than a predetermined threshold.

18. The apparatus according to claim 12, wherein the compensation module estimates mean frequencies of the Doppler signals in the gap from mean frequencies of the Doppler signals before and after the gap by interpolation and then determines frequencies of complex sinusoidal signals for the frequency modulation based on the difference between the estimated mean frequencies of the Doppler signals in the gap and the mean frequencies of the Doppler signals before and/or after the gap, and finally multiplies the Doppler signal to be filled by the complex sinusoidal signal to implement the frequency compensation.

19. The apparatus according to claim 18, wherein estimating mean frequencies of the Doppler signals in the gap by interpolation comprises compensation of spectral aliasing.

20. The apparatus according to claim 18, wherein the Doppler signals to be filled multiplied by the complex sinusoidal signals may be both the Doppler signals before the gap and the Doppler signal after the gap, or alternatively either of them according to judgement on the respective spectral parameters.

21. The apparatus according to claim 12, wherein the filling module weights the frequency compensated Doppler signals to be filled by a window function decreasing gradually to 0 at both ends and weights the original Doppler signal before the gap by a window function decreasing gradually from 1 to 0, and weights the original Doppler signal after the gap by a window function increasing gradually from 0 to 1.

* * * * *